United States Patent
Lu Hill et al.

(10) Patent No.: US 10,846,934 B2
(45) Date of Patent: *Nov. 24, 2020

(54) CAMERA-BASED OBJECT TRACKING AND MONITORING

(71) Applicant: ExtendView Inc., Los Angeles, CA (US)

(72) Inventors: Douglas Lu Hill, Los Angeles, CA (US); Priscilla Lu, Los Angeles, CA (US)

(73) Assignee: Extendview Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,110

(22) Filed: Oct. 2, 2018

(65) Prior Publication Data

US 2019/0102950 A1 Apr. 4, 2019

Related U.S. Application Data

(60) Provisional application No. 62/567,502, filed on Oct. 3, 2017.

(51) Int. Cl.
*G06T 19/00* (2011.01)
*G06T 13/40* (2011.01)
*G06T 7/246* (2017.01)

(52) U.S. Cl.
CPC ............ *G06T 19/006* (2013.01); *G06T 7/246* (2017.01); *G06T 13/40* (2013.01); *G06T 2207/10016* (2013.01); *G06T 2207/10024* (2013.01); *G06T 2207/30204* (2013.01)

(58) Field of Classification Search
CPC ....... G06T 19/006; G06T 7/246; G06T 13/40; G06T 2207/10016; G06T 2207/10024; G06T 2207/30204
See application file for complete search history.

(56) References Cited

U.S. PATENT DOCUMENTS

| | | | |
|---|---|---|---|
| 10,065,074 B1* | 9/2018 | Hoang | G09B 19/003 |
| 10,134,296 B2* | 11/2018 | Anderson | G09B 19/003 |
| 2008/0220941 A1 | 9/2008 | Shaw et al. | |
| 2010/0173276 A1* | 7/2010 | Vasin | A63B 24/0006 434/307 R |
| 2012/0206577 A1* | 8/2012 | Guckenberger | G09B 19/003 348/47 |

(Continued)

OTHER PUBLICATIONS

Non-Final Office Action for U.S. Appl. No. 16/150,120, dated Feb. 4, 2020 32 pages.

(Continued)

*Primary Examiner* — Michael Le
(74) *Attorney, Agent, or Firm* — Nicholson De Vos Webster & Elliott LLP

(57) ABSTRACT

Techniques are disclosed for capturing and monitoring object motion in an AR environment. Image data of at least one target may be captured, and the motion of the at least one target may be tracked in the image data. The image data may be augmented with a shadow object and/or a training object to generate augmented image data, the shadow object mirroring the motion of the at least one target. The training object can be caused to perform at least one movement sequence, and the augmented image data can be displayed on at least one display device.

17 Claims, 8 Drawing Sheets

(56) References Cited

U.S. PATENT DOCUMENTS

| | | | |
|---|---|---|---|
| 2013/0123667 A1* | 5/2013 | Komatireddy | A61B 5/486 600/595 |
| 2014/0188009 A1* | 7/2014 | Lange | A61B 5/1127 600/595 |
| 2015/0098143 A1* | 4/2015 | Anderson | G03B 21/10 359/839 |
| 2015/0099252 A1* | 4/2015 | Anderson | G06T 7/251 434/257 |
| 2017/0055851 A1* | 3/2017 | Al-Ali | A61B 5/14552 |
| 2018/0242920 A1* | 8/2018 | Hresko | G06F 3/011 |

OTHER PUBLICATIONS

Final Office Action for U.S. Appl. No. 16/150,120, dated Jul. 10, 2020, 40 pages.

* cited by examiner

CAMERA-BASED OBJECT TRACKING AND MONITORING

CROSS-REFERENCE TO RELATED APPLICATIONS

This application claims the benefit of U.S. Provisional Application No. 62/567,502, filed Oct. 3, 2017, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for augmented reality (AR) guides and more particularly, but not exclusively, to camera-based object tracking and monitoring in an AR environment.

BACKGROUND

Augmented reality (AR) allows a user's view of the real world to be superimposed with computer generated images (e.g., virtual images) and other augmented information. The augmented information can include visual, auditory, haptic, or other sensory information that is provided to the user as they navigate an AR environment. This allows for additional data linked to real world objects to be displayed or otherwise provided to the user.

SUMMARY

Techniques are disclosed for capturing and monitoring object motion in an AR environment. Image data of at least one target may be captured, and the motion of the at least one target may be tracked in the image data. The image data may be augmented with a shadow object and/or a training object to generate augmented image data, the shadow object mirroring the motion of the at least one target. The training object can be caused to perform at least one movement sequence, and the augmented image data can be displayed on at least one display device.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

As used herein, the following terms may be used according to the following definitions:

Screen View: The view shown to a user on an augmented reality (AR) display device.

Camera View: A front view of the user, with camera facing the user.

Eye View: A view that approximates the user's view as seen from his/her own eyes.

Mirror View: Any view of the user which represents a view of the user as if viewed in a mirror.

Shadow View Object: A wireframe or simplified view of a target being captured in image data, such as a user, which emulates the actions of the target in real time.

Tutor Guide: A training object which may be displayed and prompts the user to perform particular actions or movements.

Augmented Object: Any object imposed on the Screen View. The shadow view object is an example of an augmented object.

Movement Sequences: A series of motions which may be performed by the tutor guide or other training object. In some embodiments, the movement sequences may represent, e.g., physician prescribed physical therapy sessions for specific conditions (tennis elbow, carpel tunnel, frozen shoulder, etc.), exercises (yoga, Pilates, aerobics, etc.), or any other series of motions.

Gaming Sequences: Additional movement sequences associated with each of the movement sequences that help enhance the intensity, and also encourage users to extend the endurance of the specific exercises.

Figure 1:
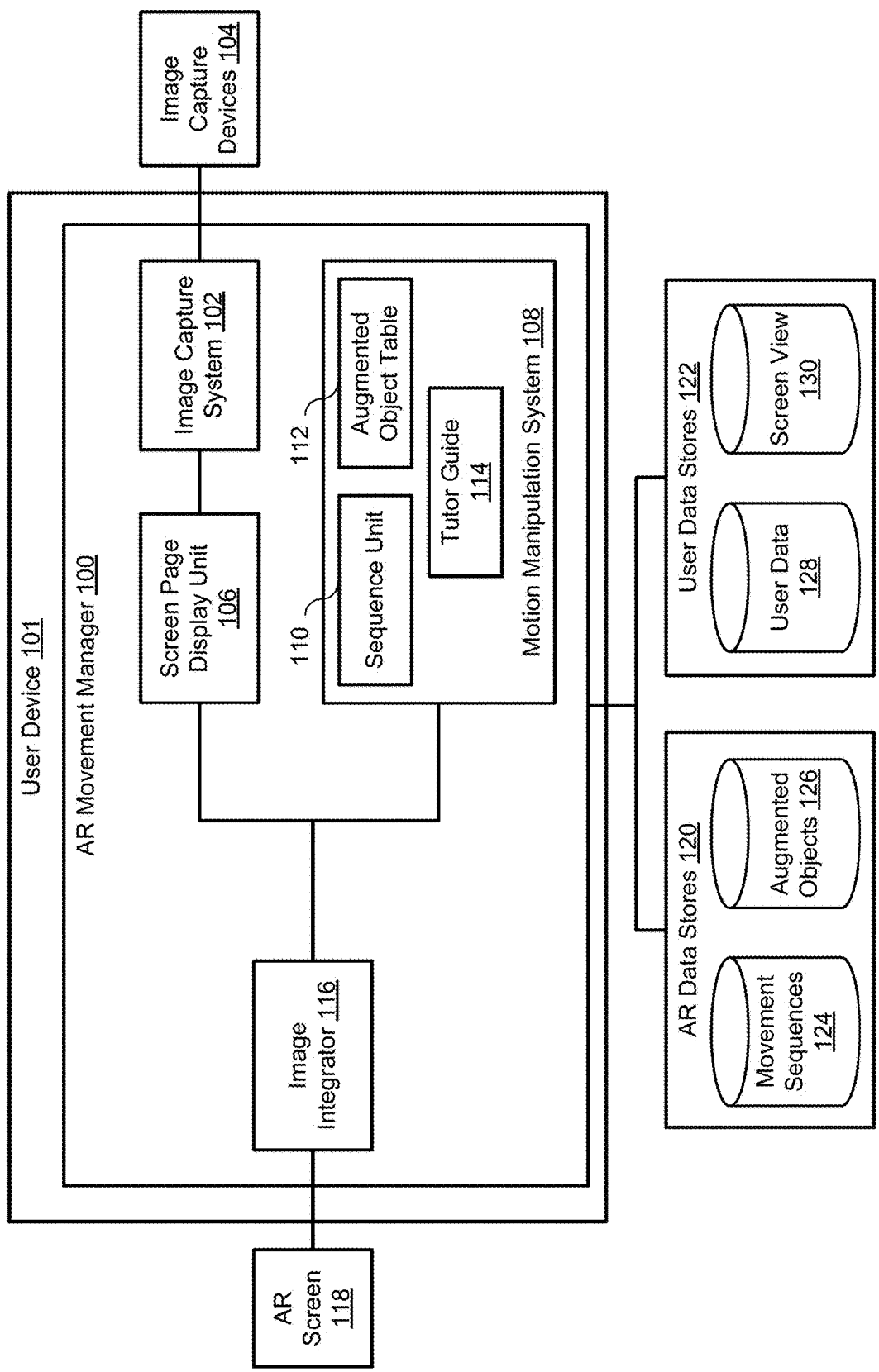
FIG. 1 illustrates an example of a camera-based object tracking and monitoring system, in accordance with various embodiments of the present invention.

FIG. 1 illustrates an example of a camera-based object tracking and monitoring system, in accordance with various embodiments of the present invention. As shown in FIG. 1, a user device 101, such as a smartphone, laptop, desktop, or other computing device may include an augmented reality (AR) movement manager 100. The AR movement manager can include an image capture system 102 which may capture image data from one or more image capture devices 104 which are directed at or around a target. The image capture devices may be deployed to the target, e.g., attached to the user's head providing an eye-view which approximates what the user sees, and/or deployed in front of (or behind, or at another position relative to) the target, providing a camera view or mirror view of the target. In some embodiments, the camera in front of the target may be placed at a specified distance and height. In some embodiments, the target may be a user, such as a patient being instructed to perform a series of movements. The image data may be analyzed by the image capture system 102 to identify feature points of the target and track the displacement of those feature points in the image data as the target moves. This movement data may be passed in real time to screen page display (SPD) unit 106. The SPD may generate a page by page image in real time showing the delta difference in motion of the shadow view and any augmented objects imposed on the screen view. Initially, a calibration object may be displayed which instructs the target to perform a series of motions to allow the image capture system to identify feature points of the target. In some embodiments, an image integrator 116 may augment the image data captured by image capture system 102 with the shadow view and other augmented objects, such as the tutor guide. As such, the augmented image data may include a representation of the target as well as the shadow view and/or other augmented objects.

In some embodiments, a motion manipulation system (MMS) can determine the motion of augmented objects based on the defined movement sequence and/or the target's shadow view motions. The MMS may include an augmented object table (AOT) 112 which includes a list of available augmented objects that can be displayed and imposed on the Screen View and displayed by the SPD in real time. The AOT may be extensible by adding additional objects to augmented objects data store 126 and adding entries for the new objects to the AOT. Each entry may include an identifier for the object and a storage location. The MMS may also include a sequence unit (SU) 110 which can create real time response to motion of the shadow view based on the Movement Sequences defined in data store 124. The SU may cause augmented objects, such as the tutor guide 114 to perform more or fewer motions depending on the user's progress, as represented by the motion of the shadow view.

In some embodiments, augmented reality (AR) system 100 may access AR data stores 120 and user data stores 122. User data stores 122 can include user data store 128 which includes confidential data, such as medical history, doctor comments, and record reporting (e.g., name, therapy prescription, exercise regiments, collected history of exercises completed, and levels of accuracy/conditions attained with dates, time, duration, doctor's report and comments, etc.). A screen view data store 130 may include screen views which are dynamically created from screen capture and retained to provide continuous page changes as the augmented object images changes position.

In some embodiments, AR data stores 120 may include a movement sequences data store 124 which may include a series of pre-programmed exercises or other movements as prescribed by a physician, therapist, instructor, or other entity. The exercise sequences can use a Tutor Guide figure or other augmented object to illustrate the movements in the Sequence Unit's database 124—these form the foundation movements that drives the real-time response of the "Tutor Guide" figure which is illustrated by the Tutor figure shown in the Augmented Reality screen which the User is instructed to follow. As discussed, the AR data stores may also include an augmented object data store which includes augmented objects that can be selected by the users to help guide its movements. In some embodiments, the user's shadow view object may be stored in the augmented objects data store after it is created during calibration. Calibration may be used to determine proportional height, length of limbs and angle positions based on various alignment parameters.

As discussed above, the image capture system can capture motion of the shadow view object, by identifying the movement of the target in the image data. Calculation of this movement data may be performed in real time. This real-time movement data may be passed to the SPD. The SPD integrates information from capture system 102 that captures the real-time motion of the user which then drives the change in positions of the shadow view shown AR screen 118. In some embodiments, additional augmented objects may be displayed which respond to the motion of the user and based on the defined movement sequences in AR data stores 120. The Motion Manipulation System (MMS) uses the information in the Sequences Unit (SU) 110 to respond in real time to the motion of the user guided by the prescription prompts from the Tutor Guides which shows where and how the movement should be done by the User based on the prescribed exercises included in movement sequences data store 124.

At startup, the user can perform an initial calibration. Images of the user may be captured and analyzed to determine height, limbs and plumb-line (e.g., vertical angle) of the user. This calibration phase ensures that the motion of users of different sizes is correctly identified by the system. In some embodiments, during calibration portions of the user's body can be identified using the representation of the user shown in the images. For example, each portion of the body (e.g., each limb, torso, neck, head, etc.) represented in the images can be labeled with a tag. In some embodiments, the tag may include a color, with different colors assigned to each portion of the user's body. The tags may be applied to the image data by the system using a machine learning image analysis system or service implementing, e.g., object detection and/or segmentation techniques. In some embodiments, the tags may be manually applied to the image data by a user (either the current user, an instructor, doctor, therapist, or other user). For example, a user may outline different portions of the image data which show different portions of the user's body and assign a color to that portion. Once each portion of the user's body has been tagged, image processing techniques may be used to estimate the size of each portion, the users, height, plumb-line, etc. The shadow view object may be rendered based on this calibration set. Once calibration is complete, the user may then select a movement sequence based on duration, intensity, etc. A tutor guide and/or other augmented objects may be displayed in the image data allowing the user to perform the movements while observing any differential that exists between the user's motions and the prescribed motions.

Embodiments described herein may be implemented using a variety of computing systems as discussed further below. For example, AR screen 118 may include a head mounted display (HMD) providing stereoscopic views to the user, a projection system including one or more projectors to display AR and VR images on one or more display surface, or other display device. Although functional components are shown and described separately, this is for simplicity of explanation only. In various embodiments, AR movement manager 100 may be integrated into AR screen 118 (e.g., where an HMD includes computing resources to perform the AR processing described above). In some embodiments, AR screen 118 may represent a thin client device that is connected to AR movement manager 100 over one or more networks (e.g., an Ethernet network, a wireless network operating using an IEEE 802.11 suite of protocols, a mobile network, etc.). Similarly, AR and user data stores 120, 122 may be implemented as local data stores to AR screen 118 and/or AR movement manager 100, or may be accessible over one or more networks. AR movement manager 100 may be implemented on various computing systems such as a video game console, desktop, laptop, workstation, or other computing device. In some embodiments, AR movement manager 100 may be implemented in a cloud computing system including various remote computing resources that may be increased or decreased dynamically based on processing or other resource requirements.

Figure 2:
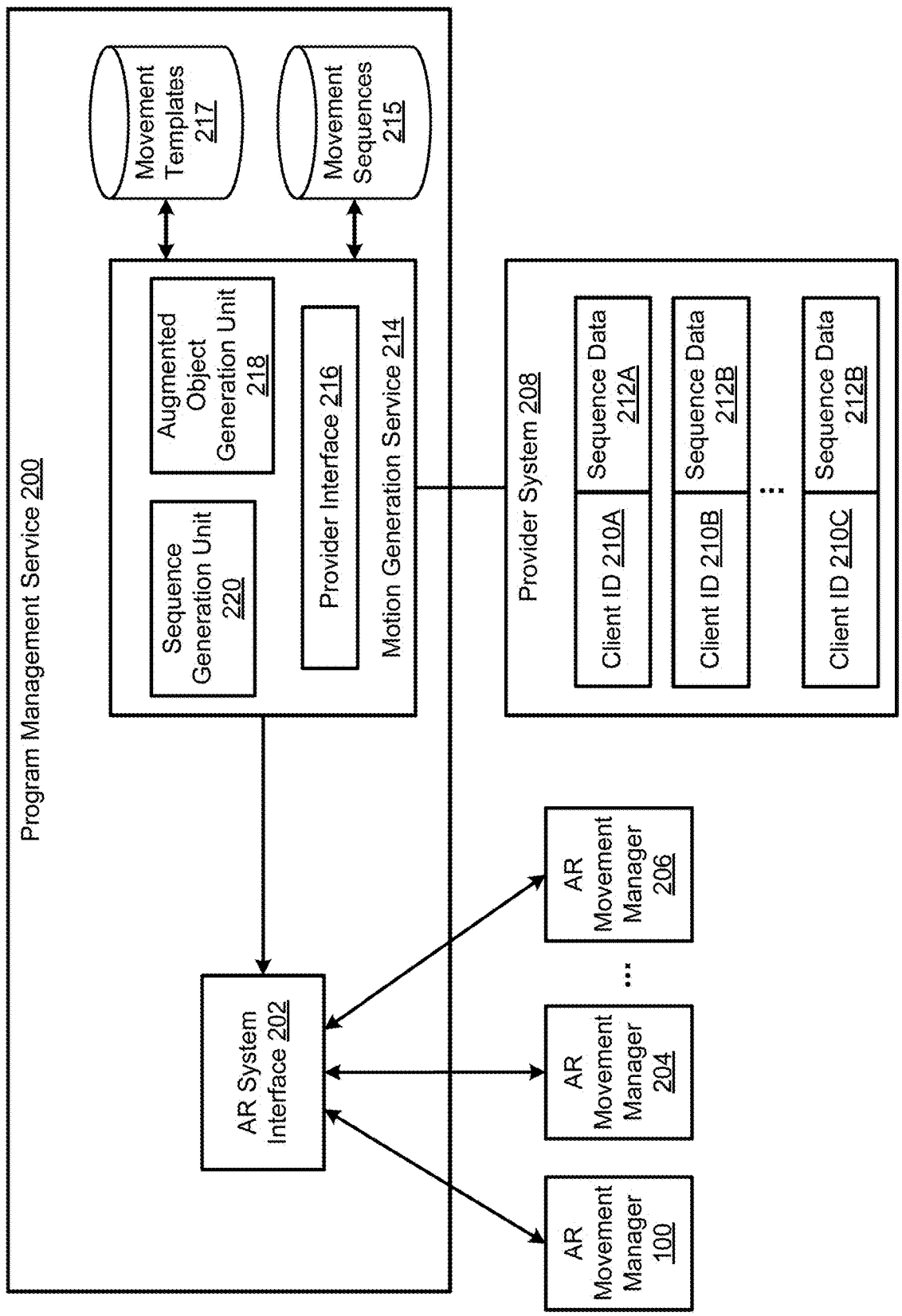
FIG. 2 illustrates an example of a program management service, in accordance with various embodiments of the present invention.

FIG. 2 illustrates an example of a program management service, in accordance with various embodiments of the present invention. As shown in FIG. 2, a program management service 200 can coordinate distribution of movement sequences (e.g., physical therapy, exercise instructions, etc.) from a provider system 208 to various connected AR movement managers 100, 204, 206. The program management service 200 can include an AR system interface 202, through which each AR movement manager can obtain new movement sequences, update existing movement sequences, or request new or different movement sequences.

In some embodiments, AR system interface 302 can provide access to movement sequences through each user device. Although the user interface is shown as part of program management service 300, each AR movement manager may provide the user interface as a graphical user interface or other user interface. The user can select from movement sequences that have been assigned to them or may search for available movement sequences to be performed. When a movement sequence is selected, the requirements of the movement sequence can be displayed. In some embodiments, a prelaunch phase can include an example of the movement sequence, such as a video demonstration, virtual demonstration, or other example of the movement. The user can then position the user device such that the user's motions are visible to the image capture device and perform calibration of the shadow view. Characteristics of the user's motion (e.g., speed, angle, repetitions, etc.) can be determined by the AR movement manager and those characteristics can be compared to an ideal form represented by the tutor guide or other augmented object. Any discrepancies in the user's movements (e.g., faster or slower than assigned, misaligned angle of movement, etc.) can be shown to the user as part of a performance history.

A provider system 208 may provide movement sequences to a plurality of different users using a plurality of different AR movement managers. For example, a doctor using provider system 208 may provide physical therapy sequences to patients using AR movement managers 100, 204, and 206. In some embodiments, the provider system can provide movement data which may include a client ID 210A-210C and corresponding sequence data 212A-212C. Each client ID may correspond to a different user and each sequence data may characterize the movements to be performed by an augmented object, such as the tutor guide.

In some embodiments, program management service 200 can include a motion generation service 214. Motion generation service 214 can receive movement data from various provider systems 208 and generate augmented objects and movement sequences based on the movement data. The movement data may be received through a provider interface 216, which may be an application programming interface, web interface, or other interface. In some embodiments, provider system 208 may execute an application implementing a software development kit (SDK) provided by program management service 200. The sequence data 212 may describe one or more movement sequences (e.g., exercises, therapeutic movements, etc.). For example, the movement sequences may define movement over time for a plurality of spatial points of an object. Augmented object generation unit 218 can generate a visualization of the plurality of spatial points and their movement over time in the form of an augmented object. For example, image or video data of an avatar, such as tutor guide 114 or other augmented object. In some embodiments, a user of an AR movement manager may request a new augmented object be generated for a given movement sequence. The augmented object generation unit 218 can generate the new augmented object and provide it to the AR movement manager via AR system interface 202.

In some embodiments, provider interface 216 may include a web portal enables through which providers may access the program management service 200, e.g., using a username and password, or other login credentials. The provider can identify a particular user to assign one or more movement sequences to, or may make one or more movement sequences available to any user accessing the service 200. When selecting a particular user, the provider can view a user dashboard, which may indicate the user's performance in previously assigned movements as well as a history of successfully completed movements. A provider can select new movement sequences from various predefined movement sequences 215 or may create new movement sequences through the provider interface 214 using one or more movement templates 217. For example, each template may correspond to a movement of a different portion of a target (e.g., a user's arm, leg, neck, etc.). The provider can define a new movement sequence by setting a required repetition, frequency, duration, range of motion, etc. for each movement in the movement sequence. Once defined, the provider can save the movement sequence to movement sequence data store 215 and assign it to the user's schedule.

In some embodiments, the sequence data 212 received from a provider system 208 may include high resolution movement data (e.g., including movement data of having a high sampling rate and/or representing the motion of a high density of spatial points). However, given variation in the processing capabilities of a user device implementing an AR movement managers (e.g., ranging from a smart phone, to a video games console, to high performance consumer electronics), every system may not be capable of effectively rendering such movements. Accordingly, a sequence generation unit 220 can convert the sequence data 212 into a format appropriate for the AR movement manager receiving the movement sequence (e.g., to be stored in movement sequences database 124). For example, sequence generation unit 220 may downsample the sequence data prior to providing it to an AR movement manager. Additionally, or alternatively, sequence generation unit 220 may provide compression services to the sequence data to more effectively transmit the sequence data over one or more network connections to a given AR movement manager.

In some embodiments, sequence generation unit 220 may generate sequence data from image movement data. For example, the movement data provided by a provider system 208 may include image data (e.g., still image data, video data, etc.) which includes a representation of an object performing a series of movements. The image data may be analyzed to determine movement characteristics, such as speed, angle, direction, etc. of the movements. In some embodiments, the image data may be associated with metadata describing, e.g., a distance from the camera to the object, object size, camera data to convert from an image coordinate system to a world coordinate system, etc. This data may be used to construct a three-dimensional representation of the object shown in the image data. Spatial points and their corresponding movements over time may then be determined from the 3D representation and provided to the AR movement managers as sequence data and/or used by augmented object generation unit 218 to generate an augmented object to be used by the AR movement managers to demonstrate the object's movement to a user.

Figure 3:
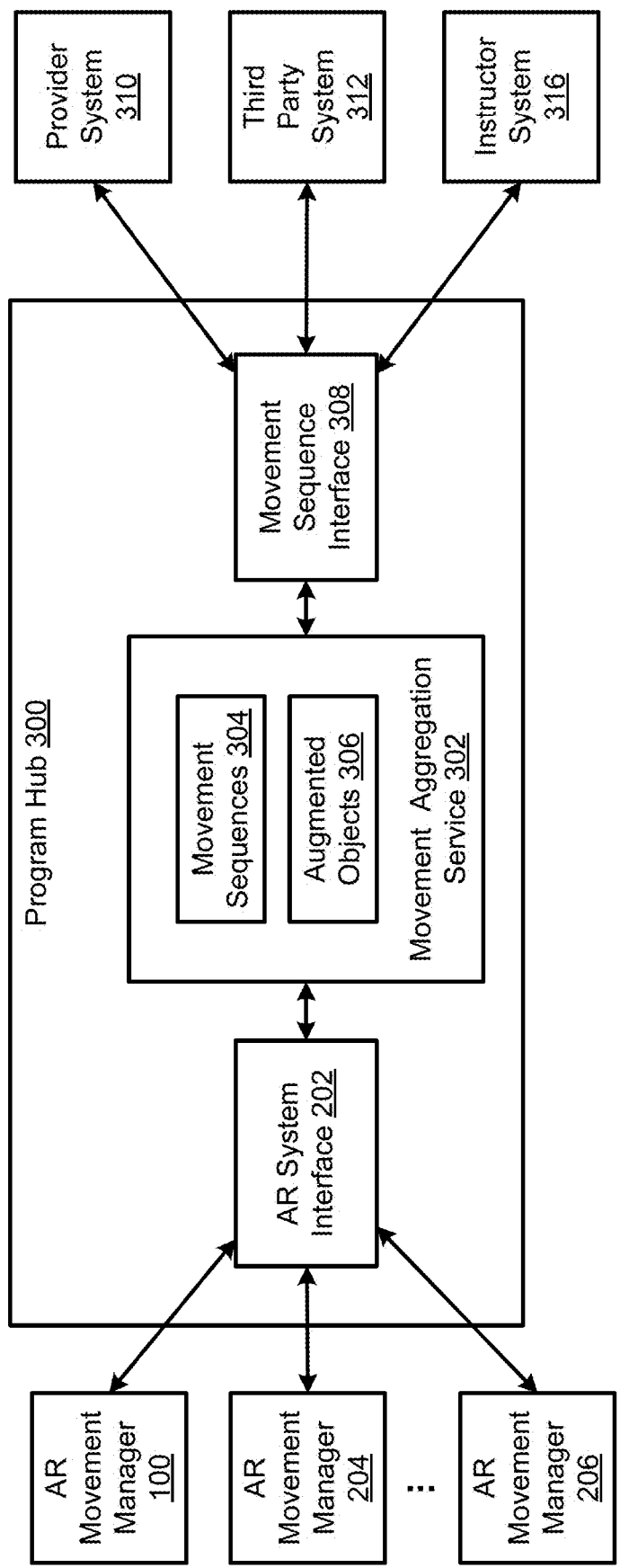
FIG. 3 illustrates an example of a program hub, in accordance with various embodiments of the present invention.

FIG. 3 illustrates an example of a program hub, in accordance with various embodiments of the present invention. As shown in FIG. 3, a program hub 300 may provide a centralized repository for various movement sequences obtained from various providers. For example, movement aggregation service 302 may include movement sequences 304 and augmented objects 306 received from a plurality of sources, such as provider systems 310 (e.g., including doctor-defined exercise regimens), third party systems 312 (e.g., commercial exercise providers, video game systems, etc.), and instructor systems 314 (e.g., including movements designed by various exercise instructors, such as yoga instructors, Pilates instructors, aerobics instructors, and/or other physical activity instructors). In some embodiments, each source may provide their movement sequences to be aggregated through movement sequence interface 308. Movement sequence interface 308 may include a web interface through which a provider or other source can upload their movement sequence. Each movement sequence can be associated with a description of the movement sequence (e.g., type of movement, exercise goals, treatment strategies, etc.).

These movements may then be aggregated by movement aggregation service 302. In some embodiments, movement aggregation service 302 can index each movement by its source and/or description (or keywords derived from the description). A user of an AR movement manager may then access the movement aggregation service 302 through an interface, such as AR system interface 202 or a different interface specific to the program hub 300. The interface may also be a web interface through which the user can search for a desired movement sequence (e.g., by provider, type of movement, etc.) and then download the movement sequence and/or augmented objects to their AR movement manager. This way, program hub 300 acts as a centralized distribution system through which new movements can be added by movement providers and obtained for use by various AR movement managers. In some embodiments, program hub 300, and the functionality described above may be incorporated into program management service 200.

Figure 4:
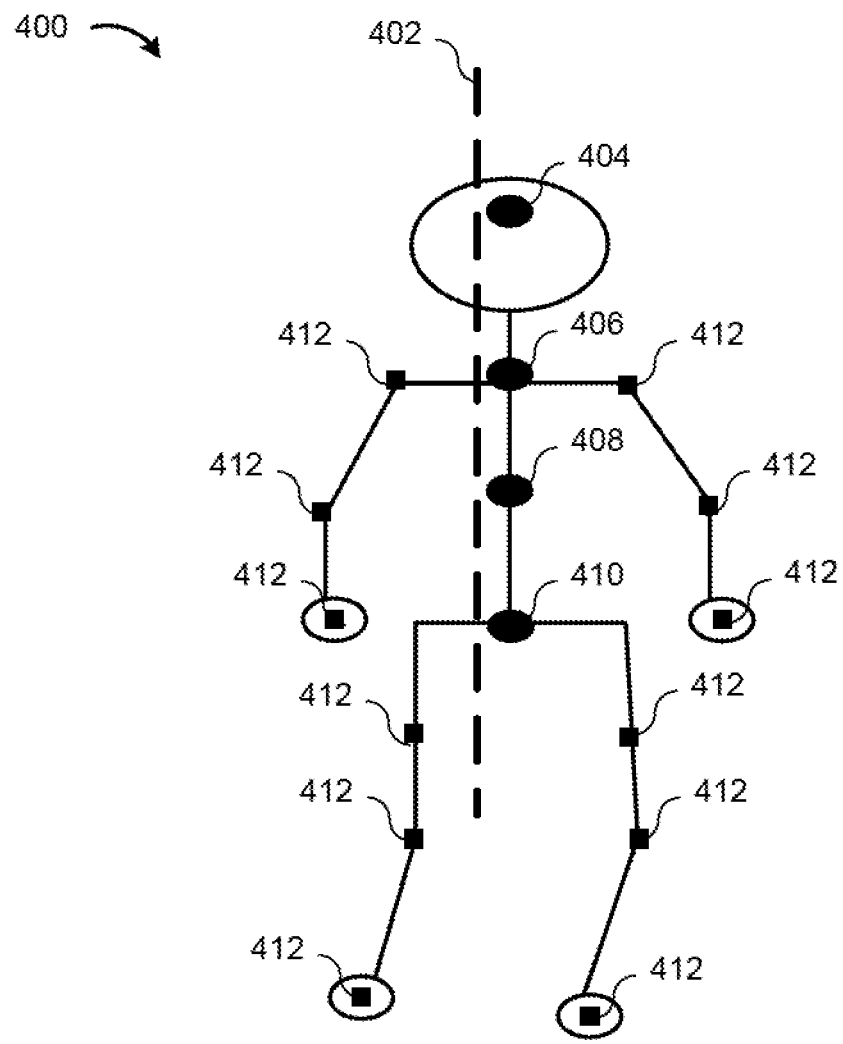
FIG. 4 illustrates an example of a shadow object corresponding to a camera-tracked target, in accordance with various embodiments.

FIG. 4 illustrates an example of a shadow object corresponding to a camera-tracked target, in accordance with various embodiments. As shown in FIG. 4, a shadow view object 400 may be constructed based on the motion and dimensions of a target and displayed in an augmented reality display device. In some embodiments, feature points of the target may be determined using computer vision and image processing techniques. For example, a plumb line 402 may be established from the target's head 404, neck 406, center/sternum 408, and tail bone 410. These locations may be identified in the image data manually, by selection by a user, or automatically using motion capture techniques. In some embodiments, image processing markers, such as reflectors, may be attached to the target, at these positions and/or any or all of feature points 412. These markers may be color contrasting to the target to improve their detection in the image data.

In some embodiments, a training object may be displayed performing different motions. The training object may be similar in shape to the target. For example, the dimensions of the target may be used to construct a similarly sized and proportioned wireframe model. The speed and complexity of the motions performed by the training object may increase based on time (e.g., every X minutes, or Y repetitions, the speed and complexity increase) and/or based on the monitored motion of the target. For example, speed and complexity may continuously increase while the target matches the motion of the training object and may slow as the motion fails to track the training object. The training object and shadow view object 400 may each be displayed as a camera view or eye view, as discussed above.

Figure 5A:
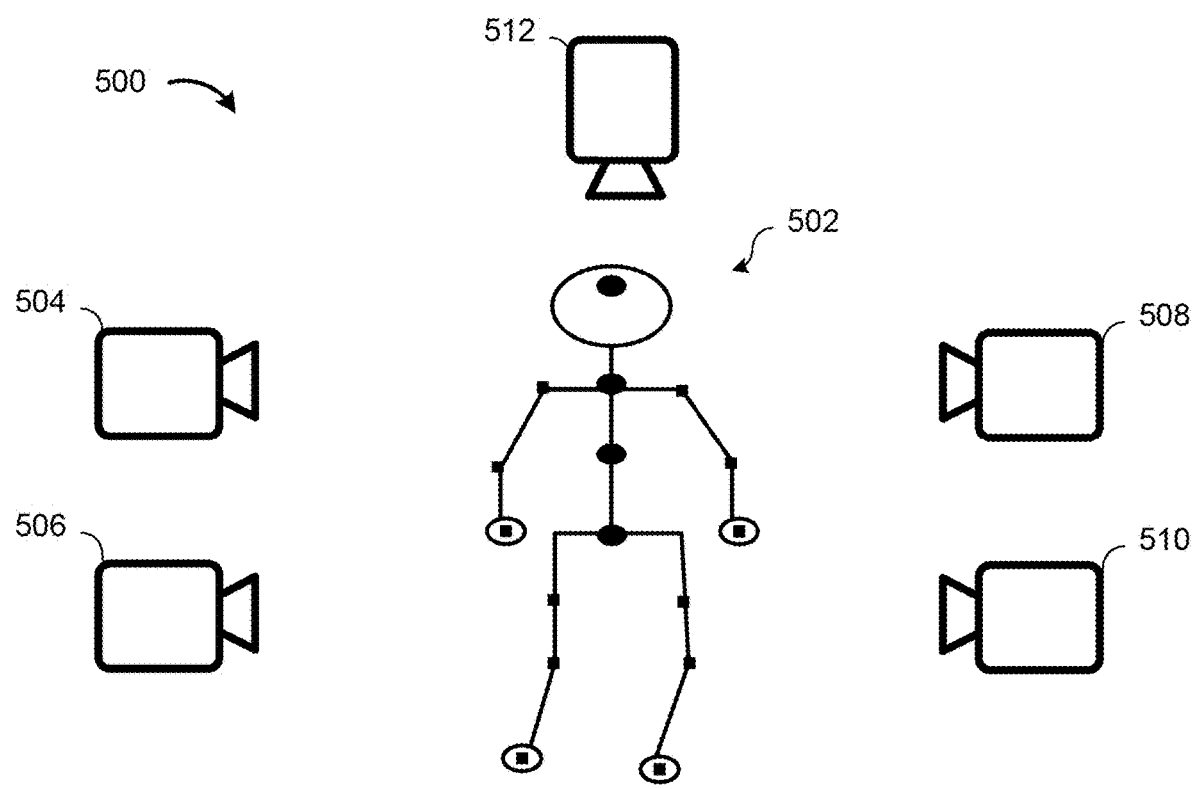
FIGS. 5A and 5B illustrate example camera setups, in accordance with various embodiments.
Figure 5B:
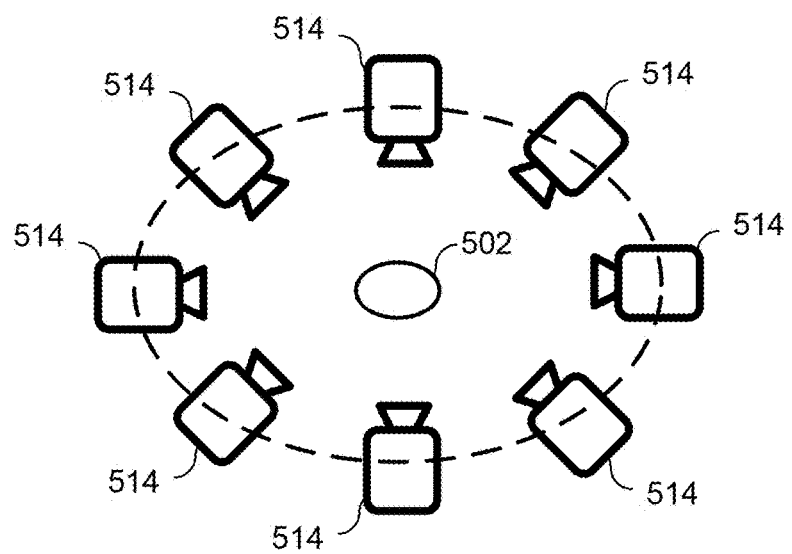

FIGS. 5A and 5B illustrate example camera setups 500, in accordance with various embodiments. As shown in FIG. 5A, the movement of a target 502, such as a user, patient, or other target, may be captured by a plurality of image capture devices. For example, image capture devices may be located at different heights behind (e.g., devices 504 and 506) the target and in front of (e.g., device 508 and 510) the target. Additionally, an overhead image capture device 512 can monitor orientation of the target as it moves in space. For example, based on the orientation of the target, as determined based on the image data captured by image capture device 512, different image capture devices 504-510 may be activated to capture the movement of the target 502. In some embodiments, as shown in FIG. 5B, image capture devices may be arrayed about an area (such as shown by devices 514) in which the target 502 is located. In some embodiments, image data may be captured by all or some of the arrayed image capture devices and the image data used to analyze the movement of the target may be selected based on image processing markers, such as reflectors, identified in the image data. In various embodiments, the image capture devices may include one or more of cameras, video cameras, 3D cameras, or any other image capture device configured to capture image data in one or more spectra of light (e.g., visible, infrared, ultraviolet, etc.). In some embodiments, image data may include video data captured by the one or more image capture devices.

Figure 6:
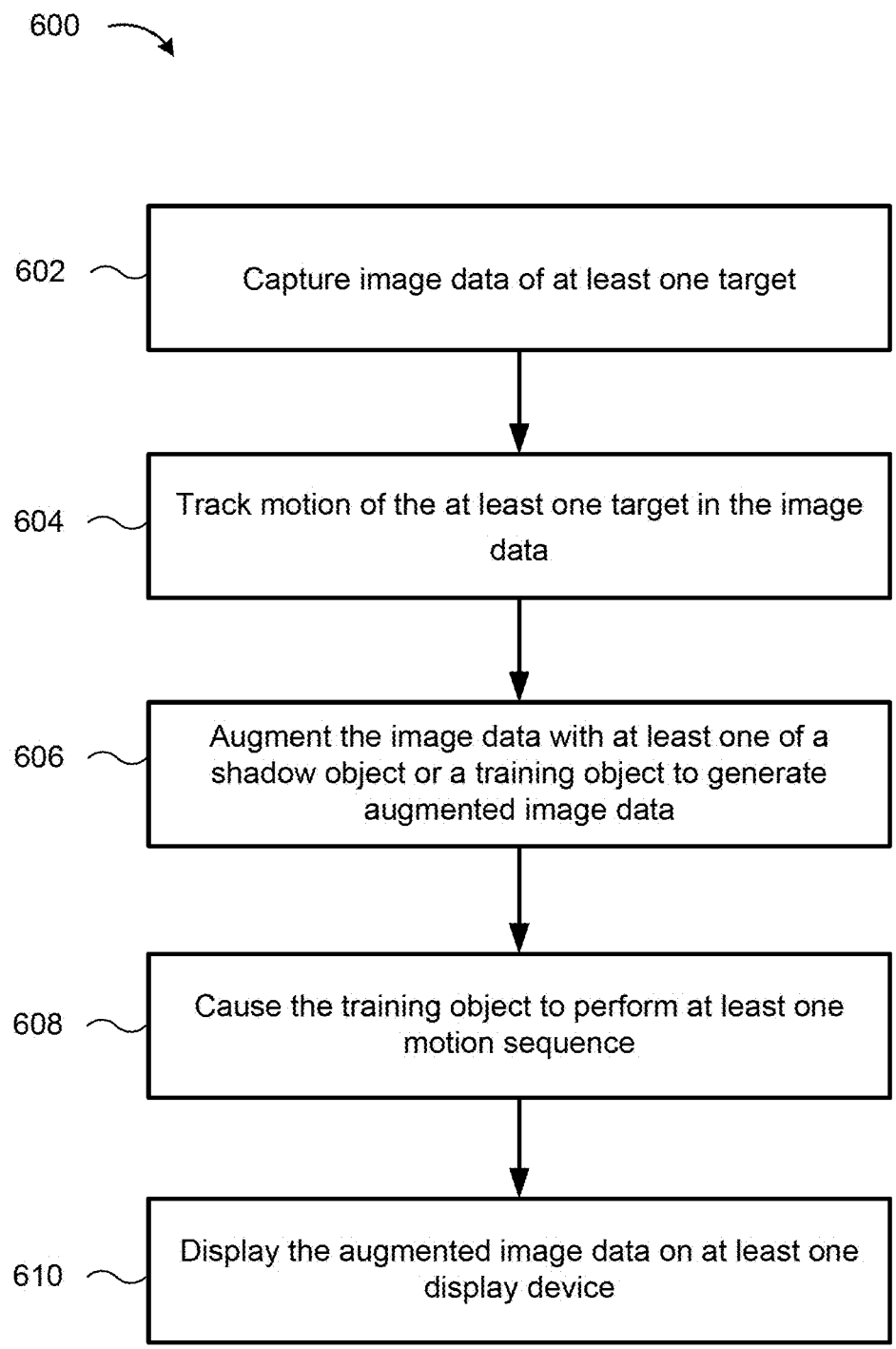
FIG. 6 illustrates an example method, in accordance with various embodiments.

FIG. 6 shows a method 600 of object tracking in an augmented reality environment, in accordance with various embodiments. The method may include, at 602, capturing image data of at least one target. The image data may be captured by one or more image capture devices, such as still or video cameras.

The method may further include, at 604, tracking motion of the at least one target in the image data. Motion tracking may be based on tracking the position of one or more nodes, such as reflectors, that are attached to the target. In some embodiments, motion tracking may be performed using image processing techniques and/or computer vision to identify feature points of the target in the image data and track the displacement of the feature points in the image data.

The method may further include, at 606, augmenting the image data with at least one of a shadow object or a training object to generate augmented image data, the shadow object mirroring the motion of the at least one target. As discussed, the shadow object may be a wireframe representation or other simplified representation of the target which moves to mimic the motion of the target.

The method may further include, at 608, causing the training object to perform at least one movement sequence. In some embodiments, the at least one movement sequence includes a motion for at least a portion of the at least one target. The method may further include, at 610, displaying the augmented image data on at least one display device. image data of at least one target is captured. As discussed, this may be displayed on an augmented reality display, such as a head mounted display or other screen. In some embodiments, instructions may be displayed to the target to mimic the motion of the training object and the motion of the target and training object may be compared and feedback provided.

In some embodiments, the method may further include performing calibration using the shadow object, wherein the shadow object is displayed in the augmented image data and the target is instructed to perform a calibration movement sequence, identifying one or more feature points of the at least one target, and tracking the one or more feature points during the calibration movement sequence.

In some embodiments, the method may further include collecting performance metrics based at least on the tracked motion of the at least one target in the image data, the performance metrics including one or more of time to complete the at least one movement sequence, performance speed, or performance accuracy relative to the training object, and providing the performance metrics to at least one provider computing device.

In some embodiments, the method may further include receiving at least one second movement sequence from the provider computing device, the at least one second movement sequence determined based on the performance metrics. In some embodiments, the method may further include determining a difference between the motion of the at least one target in the image data and the training object, and causing the training object to perform at least one second movement sequence based at least on the difference.

In some embodiments, augmenting the image data with at least one of a shadow object or a training object to generate augmented image data, the shadow object mirroring the motion of the at least one target may further include determining the motion of the at least one target, and driving a motion of the shadow object based on the motion of the at least one target object.

Figure 7:
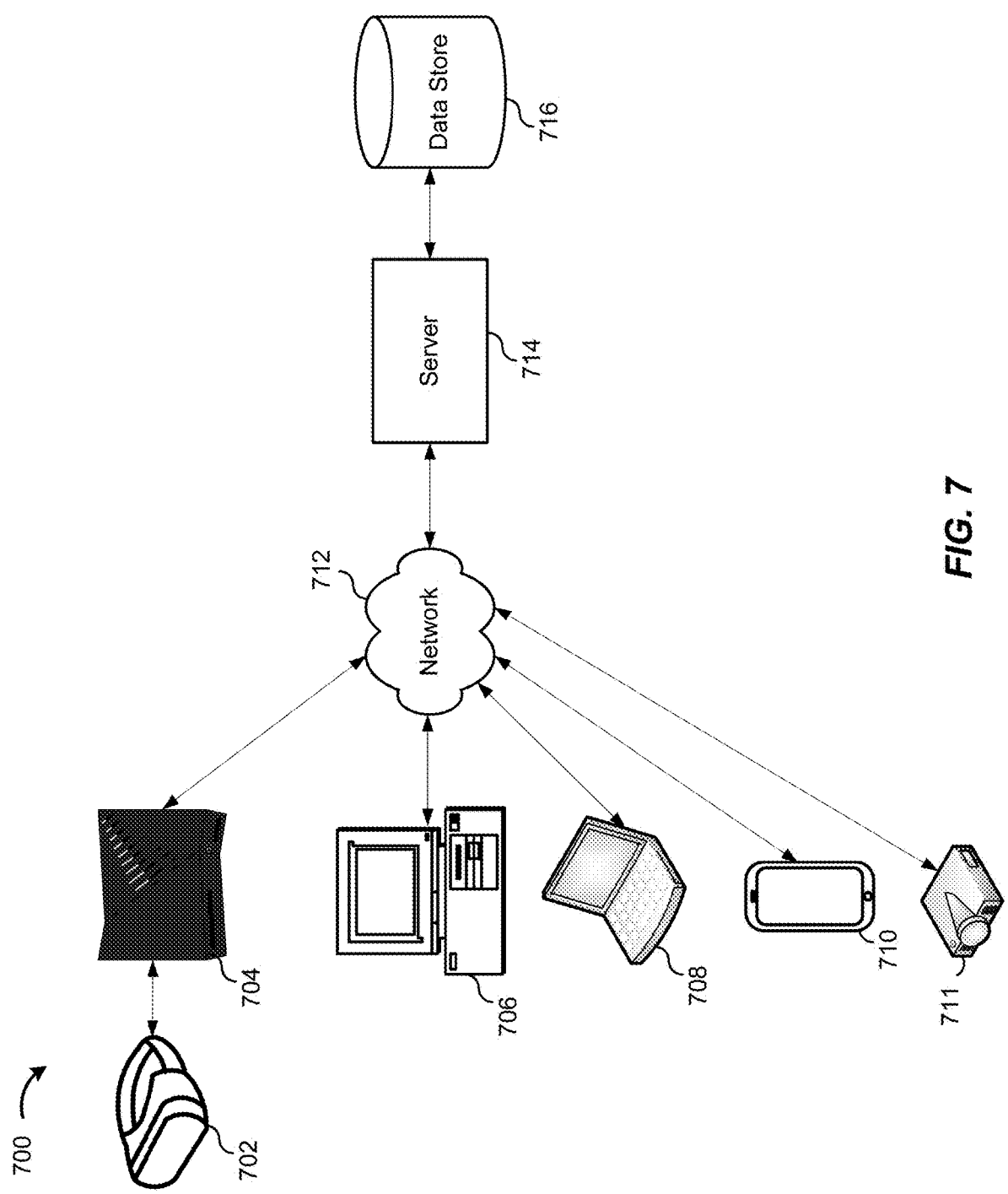
FIG. 7 illustrates an example of a networked system environment, in accordance with various embodiments.

FIG. 7 illustrates an example of a networked system environment, in accordance with various embodiments. As shown in FIG. 7, system environment 700 may include at least one client device 702-711, each of which may execute an application such as an augmented reality/virtual reality application, web browser, or other application. In various embodiments, client devices 702-711 may communicate with at least one server computer 714 over one or more networks 712.

In some embodiments, the client devices 702-711 may include a general purpose personal computer, such as a desktop 706, laptop 708, or other personal or workstation computer running one or more operating systems (e.g., Microsoft Windows, Apple macOS, iOS, Android, Unix or Unix-based OS, or other operating systems), and/or a mobile device 710, including smartphones, tablet computers, or PDAs. In some embodiments, the client devices may include a VR enabled gaming console 704 or computing device, including a head mounted display (HMD) 702. In some embodiments, the client device may include an HMD with all necessary computing resources integrated therein such that a separate computer or gaming console is not required to drive the HMD. In some embodiments, the client devices may include a projection system which includes one or more projectors 711 to project VR or AR images in a room or on one or more display surfaces. The projection system may be driven by a separate computing system connected locally or through network 712 or may include computing resources integrated therein. Although system environment 700 includes six client devices, any number of network-enabled client devices may be supported. Other devices such as devices with sensors, etc. may interact with server 712.

Client devices 702-711 can communicate with at least one server computer over network 710. Network 712 may be any type of network familiar to those skilled in the art that can support data communications using any of a variety of commercially-available protocols, including such as TCP/IP or other suitable protocols. Network 710 may be a wired or wireless local area network (LAN or WLAN), such as an Ethernet network, a wireless network operating using an IEEE 802.11 suite of protocols, the Bluetooth protocol known in the art, and/or any other wireless protocol); and/or any combination of these and/or other networks. Server computer 714 which may include general purpose computers, specialized server computers, server clusters, or any other appropriate computing device capable of running the services and/or applications discussed herein. Server 714 may run an operating system including any of those discussed above and server applications, including HTTP servers, FTP servers, CGI servers, Java servers, database servers, or other server applications.

Server 714 can communicate with one or more data stores 716 which may be located locally at server 714 or may be located remotely and accessed over one or more networks (not shown) or over a storage-area network (SAN). In some embodiments, data store 716 may include one or more databases, such as relational databases, or a storage service, such as an object data store, block data store, or other cloud or network-based storage service.

Figure 8:
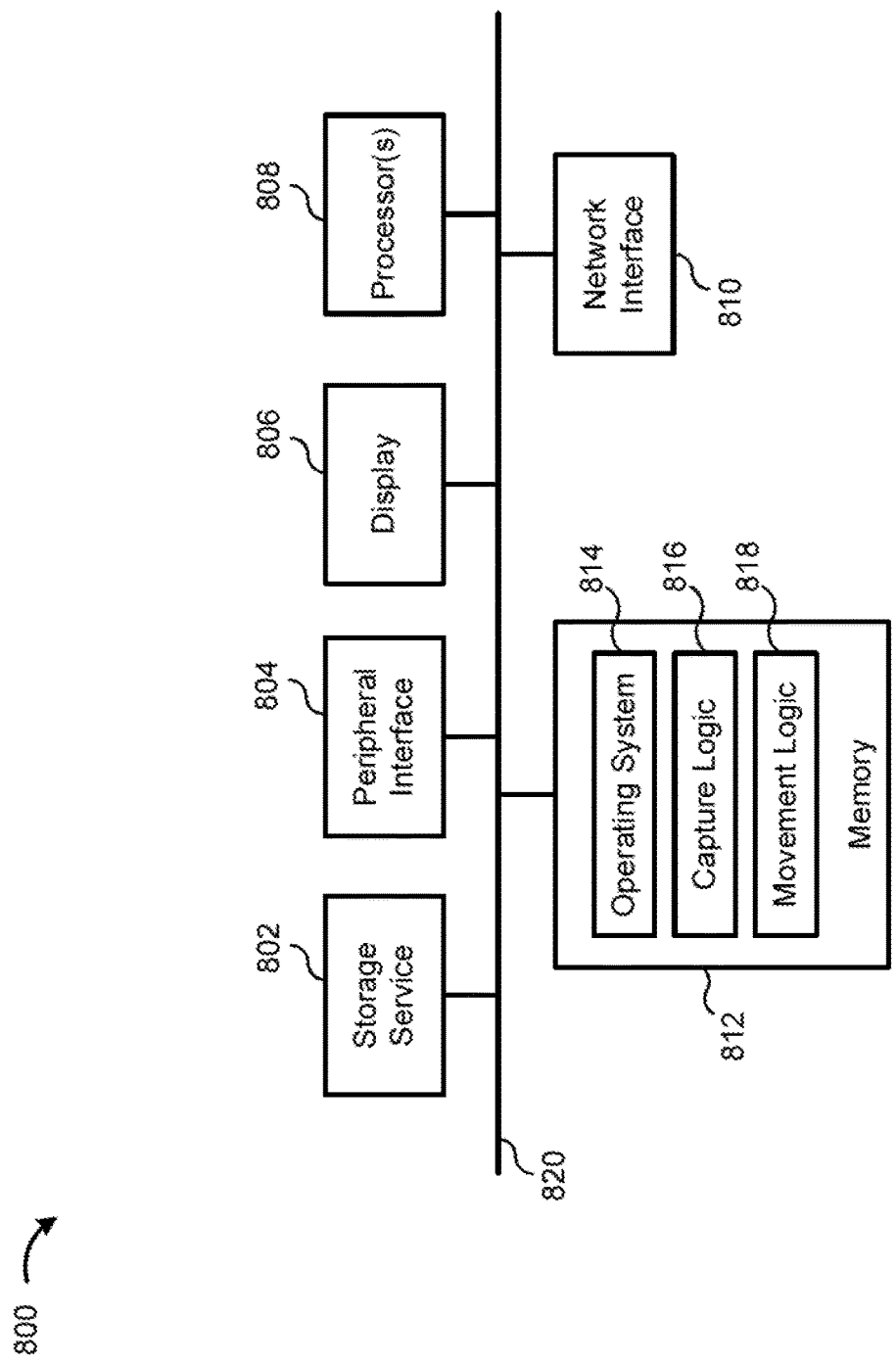
FIG. 8 illustrates an example of a computer system, in accordance with various embodiments of the present invention.

FIG. 8 illustrates an example of a computer system, in accordance with various embodiments of the present invention. For example, the systems discussed herein may be implemented using computer systems such as that shown in FIG. 8. Computer system 800 can include various components coupled via a bus 820. The components may include a storage system or storage system interface 802 which may provide read/write access to one or more non-transitory computer readable storage media. The storage media may be located locally or remotely, and may be accessed directly or through a storage service, such as an object data store, block data store, or other cloud or network-based storage service. The storage media may include devices such as disk drives, optical storage devices, and solid-state storage devices such as a random access memory (RAM) and/or a read-only memory (ROM), which can be programmable, flash-updateable and/or the like.

The computer system may also include a peripheral device interface 804 which can enable the computer system to communicate with input devices (e.g., a mouse, a keyboard, external storage readers, image capture devices, etc.), and an output device interface 806 which may provide output to one or more devices, such as a display device, head mounted display, wearable device or sensor, printers, etc. Processors 808 may include single or multicore CPUs, graphics processing units (GPUs), a digital signal processor (DSP), physics processing units, a special-purpose processor, an application specific integrated circuit (ASIC), application-specific instruction-set processors, field-programmable gate array (FPGA) devices, coprocessors, network processing units, audio processing units, encryption processing units, or other processing device. Computer system 800 may include a network interface 810, which may include one or more of a network card, wireless communication module (e.g., 802.11 compatible wireless module, Bluetooth module, etc.), wired network interface such as an ethernet card, an infra-red communication device, etc.

Computer system 800 may also include memory 812 which may include RAM, ROM, EEPROM, flash memory or other memory technology, CD-ROM, digital versatile disk (DVD) or other optical storage, magnetic storage devices, or any other storage medium. Memory 812 may include software, such as operating system code 814, application programs such as a client application, Web browser, RDBMS, etc. Memory 812 may also include applications as discussed herein, such as image capture logic 816 and motion tracking logic 818.

Embodiments discussed herein can be implemented in hardware, software, firmware, or combinations thereof. Consequently, features of the present invention may be implemented using a processing system (e.g., including one or more processors). As discussed, embodiments may be implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed is:

1. A method, comprising:
    causing at least one display device to render a calibration object, wherein the calibration object performs a calibration movement sequence;
    capturing first image data of at least one target performing the calibration movement sequence;
    identifying one or more feature points in the first image data of the at least one target while performing the calibration movement sequence to determine dimensions of the at least one target based on the calibration movement sequence performed by the at least one target in the first image data, wherein the dimensions of the at least one target determined while performing the calibration movement sequence include proportional height, length of limbs, and plumb-line of the at least one target;
    capturing second image data of the at least one target;
    tracking motion of the at least one target in the second image data;
    generating a shadow object based on the dimensions of the at least one target;
    augmenting the second image data with the shadow object and a training object to generate augmented image data, the shadow object emulating the motion of the at least one target;
    causing the training object to perform at least one movement sequence;
    causing the at least one display device to render the augmented image data including the shadow object emulating the motion of the at least one target and the training object performing the at least one movement sequence;
    collecting performance metrics based at least on the tracked motion of the at least one target in the second image data, the performance metrics including time to complete the at least one movement sequence, performance speed, and performance accuracy relative to the training object; and
    causing the at least one display device to render the training object performing at least one second movement sequence different from the first movement sequence based on the performance metrics.

2. The method of claim 1, further comprising:
    providing the performance metrics to at least one provider computing device; and
    receiving the at least one second movement sequence from the provider computing device, the at least one second movement sequence determined based on the performance metrics.

3. The method of claim 2, further comprising:
    generating the at least one second movement sequence by the provider system by downsampling movement data associated with the at least one second movement sequence based at least on performance features associated with a computing device coupled to the at least one display device.

4. The method of claim 1, further comprising:
    determining a difference between the motion of the at least one target in the image data and the training object when performing the at least one second movement sequence, wherein the at least one second movement sequence is associated with a first exercise; and
    causing the at least one display device to render the training object performing at least one third movement sequence associated with a different exercise.

5. The method of claim 1, wherein augmenting the image data with at least one of a shadow object or a training object to generate augmented image data, the shadow object mirroring the motion of the at least one target further comprises:
    determining the motion of the at least one target; and
    driving a motion of the shadow object based on the motion of the at least one target.

6. The method of claim 1, wherein the at least one movement sequence includes a motion for at least a portion of the at least one target.

7. The method of claim 1, wherein identifying one or more feature points in the first image data of the at least one target while performing the calibration movement sequence to determine dimensions of the at least one target based on the calibration movement sequence performed by the at least one target, further comprises:
    identifying different portions of the at least one target; and
    labeling the different portions of the at least one target with tags, wherein different tags are associated with the different portions, wherein the different tags are associated with different visual characteristics.

8. The method of claim 7, wherein the different portions of the at least one target are labeled using a machine learning based image analysis system.

9. A system, comprising:
    at least one processor;
    a display device connected to the at least one processor; and
    an augmented reality movement manager including instructions which, when executed by the at least one processor, cause the augmented reality movement manager to:
    cause at least one display device to render a calibration object, wherein the calibration object performs a calibration movement sequence;
    capture first image data of at least one target performing the calibration movement sequence;

identify one or more feature points in the first image data of the at least one target while performing the calibration movement sequence to determine dimensions of the at least one target based on the calibration movement sequence performed by the at least one target in the first image data, wherein the dimensions of the at least one target determined while performing the calibration movement sequence include proportional height, length of limbs, and plumb-line of the at least one target;

capture second image data of the at least one target;

track motion of the at least one target in the second image data;

generate a shadow object based on the dimensions of the at least one target;

augment the second image data with the shadow object and a training object to generate augmented image data, the shadow object emulating the motion of the at least one target;

cause the training object to perform at least one movement sequence;

cause the at least one display device to render the augmented image data including the shadow object emulating the motion of the at least one target and the training object performing the at least one movement sequence;

collect performance metrics based at least on the tracked motion of the at least one target in the second image data, the performance metrics including time to complete the at least one movement sequence, performance speed, and performance accuracy relative to the training object; and cause the at least one display device to render the training object performing at least one second movement sequence different from the first movement sequence based on the performance metrics.

10. The system of claim 9, wherein the instructions, when executed, further cause the augmented reality movement manager to:

provide the performance metrics to at least one provider computing device; and receive the at least one second movement sequence from the provider computing device, the at least one second movement sequence determined based on the performance metrics.

11. The system of claim 9, wherein the instructions, when executed, further cause the augmented reality movement manager to:

determine a difference between the motion of the at least one target in the image data and the training object when performing the at least one second movement sequence, wherein the at least one second movement sequence is associated with a first exercise; and causing the at least one display device to render the training object performing at least one third movement sequence associated with a different exercise.

12. The system of claim 9, wherein the instructions to augment the image data with at least one of a shadow object or a training object to generate augmented image data, the shadow object mirroring the motion of the at least one target, when executed, further cause the augmented reality movement manager to:

determine the motion of the at least one target; and drive a motion of the shadow object based on the motion of the at least one target.

13. The system of claim 9, wherein the at least one movement sequence includes a motion for at least a portion of the at least one target.

14. A non-transitory computer readable storage medium including instruction stored thereon which, when executed by at least one processor, causes the at least one processor to:

cause at least one display device to render a calibration object, wherein the calibration object performs a calibration movement sequence;

capture first image data of at least one target performing the calibration movement sequence;

identify one or more feature points in the first image data of the at least one target while performing the calibration movement sequence to determine dimensions of the at least one target based on the calibration movement sequence performed by the at least one target in the first image data, wherein the dimensions of the at least one target determined while performing the calibration movement sequence include proportional height, length of limbs, and plumb-line of the at least one target;

capture second image data of the at least one target;

track motion of the at least one target in the second image data;

generate a shadow object based on the dimensions of the at least one target;

augment the second image data with the shadow object and a training object to generate augmented image data, the shadow object emulating the motion of the at least one target;

cause the training object to perform at least one movement sequence;

cause the at least one display device to render the augmented image data including the shadow object emulating the motion of the at least one target and the training object performing the at least one movement sequence;

collect performance metrics based at least on the tracked motion of the at least one target in the second image data, the performance metrics including time to complete the at least one movement sequence, performance speed, and performance accuracy relative to the training object; and cause the at least one display device to render the training object performing at least one second movement sequence different from the first movement sequence based on the performance metrics.

15. The non-transitory computer readable storage medium of claim 14, wherein the instructions, when executed, further cause the at least one processor to:

collect performance metrics based at least on the tracked motion of the at least one target in the image data, the performance metrics including one or more of time to complete the at least one movement sequence, performance speed, or performance accuracy relative to the training object; and provide the performance metrics to at least one provider computing device; and receive the at least one second movement sequence from the provider computing device, the at least one second movement sequence determined based on the performance metrics.

16. The non-transitory computer readable storage medium of claim 14, wherein the instructions, when executed, further cause the at least one processor to:

determine a difference between the motion of the at least one target in the image data and the training object when performing the at least one second movement sequence, wherein the at least one second movement sequence is associated with a first exercise; and causing the at least one display device to render the training object performing at least one third movement sequence associated with a different exercise.

17. The non-transitory computer readable storage medium of claim 14, wherein the instructions to augment the image data with at least one of a shadow object or a training object to generate augmented image data, the shadow object mirroring the motion of the at least one target, when executed, further cause the at least one processor to:

determine the motion of the at least one target; and
drive a motion of the shadow object based on the motion of the at least one target.

* * * * *